United States Patent [19]

Steinemann

[11] Patent Number: 4,690,163
[45] Date of Patent: Sep. 1, 1987

[54] METHOD AND APPARATUS FOR REGULATING FLUID FLOW

[75] Inventor: Robert Steinemann, Thayngen, Switzerland

[73] Assignee: Georg Fischer Aktiengesellschaft, Schaffhausen, Switzerland

[21] Appl. No.: 938,812

[22] Filed: Dec. 8, 1986

Related U.S. Application Data

[63] Continuation-in-part of Ser. No. 854,663, Apr. 18, 1986, abandoned, which is a continuation of Ser. No. 653,694, Sep. 21, 1984, abandoned.

[30] Foreign Application Priority Data

Sep. 27, 1983 [CH] Switzerland .................. 5221/83

[51] Int. Cl.⁴ .................................... G05D 16/20
[52] U.S. Cl. ........................... 137/8; 137/14; 137/486; 137/487.5
[58] Field of Search ............ 137/486, 487.5, 1, 14, 137/8; 318/644, 645

[56] References Cited

U.S. PATENT DOCUMENTS 3,295,421  1/1967  McCormick .
3,369,561  2/1968  Zimmerman et al. ............ 137/486
3,487,458  12/1969  Martens et al. .
3,652,912  3/1972  Bordonaro .
3,796,939  3/1974  Raggi et al. .
4,253,480  3/1981  Kessel ................. 137/487.5 X
4,261,509  4/1981  Anders ................. 137/487.5 X

FOREIGN PATENT DOCUMENTS 1954636  5/1971  Fed. Rep. of Germany .
1542518  9/1968  France .
2406246  10/1977  France .
1319157  6/1973  United Kingdom .

Primary Examiner—Alan Cohan
Attorney, Agent, or Firm—Toren, McGeady & Associates

[57] ABSTRACT

A method for regulating the flow volume of a fluid medium and apparatus therefor wherein the actual value of the flow volume of the fluid medium is measured and an analogous signal is generated representing the actual value. A signal representing a desired value of flow volume is also generated and is compared with the actual value signal with the analogous differential signal being applied as an electrical control signal consisting of individual pulse signals having a frequency proportional to the value of the analogous differential signal. The control signal is amplified and applied to control either the pressure or the rate of flow of the fluid medium.

10 Claims, 4 Drawing Figures

METHOD AND APPARATUS FOR REGULATING FLUID FLOW

This is a continuation-in-part of application Ser. No. 854,663, filed Apr. 18, 1986, which was a continuation of application Ser. No. 653,694, filed Sept. 21, 1984, both now abandoned.

The present invention relates generally to fluid flow control devices and, more particularly, to a method for regulating the flow volume of a fluid medium, particularly for regulating the rate of flow and/or the pressure of the fluid medium.

Regulating methods and apparatus of the type to which the present invention relates usually operate in a manner whereby analogous control signals are converted and are conducted as three point signals directly to an electric servomotor. If the regulating unit is a hydraulically or pneumatically actuated valve or control element, corresponding pressure of the fluid medium is set in a known manner in a second hydraulic or pneumatic control circuit corresponding to the analogous electrical control signal, wherein the control device must, for this purpose, have an appropriate converter, for example, a pressure regulator which is controlled by current.

This tends to involve a very complicated control procedure having several control loops and involving the disadvantage that the same electrical control device cannot be utilized simultaneously for the direct control of an electric servomotor.

Accordingly, the present invention is directed toward providing a control procedure or method in a suitable system of the aforementioned type wherein electrical output signals of the control device are adapted to be utilized either directly for control of an electric motor at the regulating unit or for the regulating units which are acted upon with a compressed medium wherein, at the same time, for the latter use, the presently required control procedures and regulating devices may be simplified.

SUMMARY OF THE INVENTION

Briefly, the present invention may be described as a method for regulating the flow volume of a fluid medium comprising the steps of measuring the actual value of the flow volume of said fluid medium, generating an analogous signal representative of said actual value, generating a signal representative of a desired value of said flow volume, comparing said actual value signal and said desired value signal and generating an analogous differential signal representative of the difference therebetween, generating an electrical control signal consisting of individual pulse signals having a frequency proportional to the value of said analogous differential signal, amplifying said control signal and applying said amplified control signal to control the pressure and/or the rate of flow of said fluid medium.

Furthermore, the invention may be described as apparatus for regulating the flow volume of a fluid medium and for performing the method previously described comprising an actual value transmitter for generating a signal representative of the actual value of the flow volume of said fluid medium, a desired value transmitter for generating a signal representative of a desired value for said flow volume, a comparator for comparing said actual value signal and said desired value signal, a regulator for receiving a signal from said comparator representative of the difference between said actual value signal and said desired value signal, at least one amplifier for amplifying a signal received from said regulator, and a regulating unit connected with said amplifier for regulating said flow volume in accordance with an amplified signal received therefrom, with at least one signal phase and with a voltage-to-frequency transformer or converter and a pulse shaper being arranged between said regulator and said amplifier.

As a result of the arrangement, in accordance with the present invention, the regulating unit has a pulse frequency whose frequency increases with an increasing difference. The regulating unit is guided in steps to the desired position in such a way that at a great difference between the desired value and the actual value, the regulating speed is high and when the difference decreases, the regulating speed is low.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there are illustrated and described preferred embodiments of the invention.

DETAILED DESCRIPTION OF THE PREFERRED EMBODIMENTS

Figure 1:
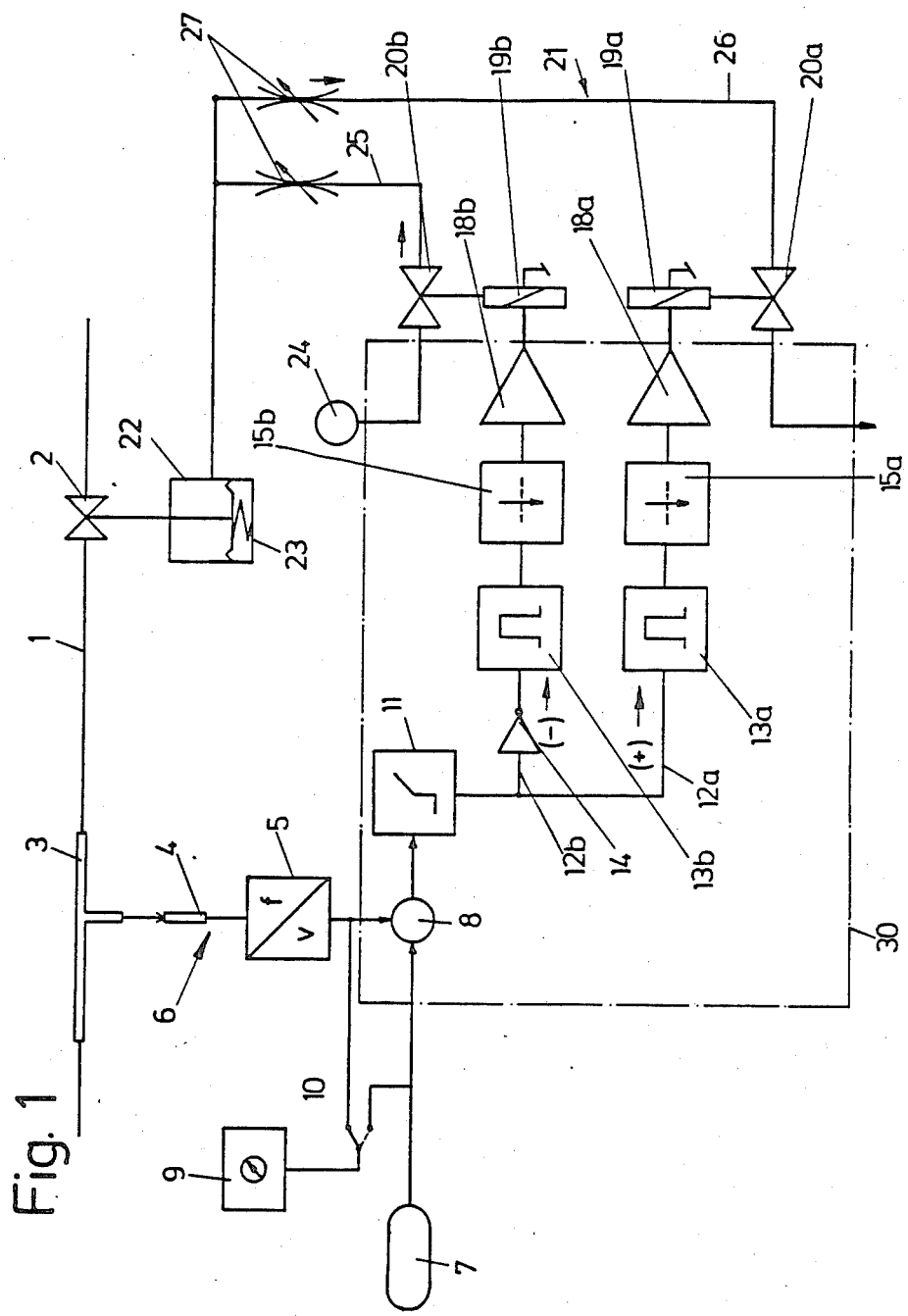
FIG. 1 is a schematic circuit diagram showing a system for the regulation of the rate of flow in a pipeline with a regulating unit which may be acted upon with a compressed medium.

Referring now to the drawings, and specifically to FIG. 1, there is shown a system in accordance with the present invention for regulating the flow volume through a pipeline 1, the system comprising a regulating unit 2 which is arranged in the pipeline 1 and which is constructed, for example, as a flow rate control valve or as a pressure control valve. An actual value transmitter 6 for transmitting a signal representative of the actual value of the flow in the pipeline 1 is formed to comprise a flow rate or pressure measuring device 3, a sensor 4, and a frequency-voltage transformer 5. The frequency signals which originate from the sensor 4 and which are dependent on the flow rate of the fluid medium in the pipeline 1 or on the pressure thereof are converted in a frequency-voltage converter 5 into analogous voltage signals.

Additionally, measuring units may be used which directly generate a voltage or current signal which corresponds to a measured value.

A desired value transmitter 7 is provided which transmits a signal representative of a desired value for the flow in the pipeline 1. The desired value transmitter 7 together with the actual value transmitter 6 are effectively connected with a comparator 8. A switch 10 is provided which enables either the actual value or the desired value to be available for reading in an indicating device 9.

The desired value signal is set either manually, for example, by using a potentiometer or it is entered as a standard signal by a leading process.

An analogous differential signal is generated in the comparator 8 from the actual value signal and the desired value signal and the analogous differential value signal thus generated is fed to a regulator 11.

Based upon its characteristics, the regulator 11 develops an output signal which may be either positive or negative wherein, depending upon the requirements and the purpose of use, the regulating device may be constructed as a P, I, PI, PD or a PID- regulator, as is generally known. The analogous control signal which is emitted by the regulator 11 is then divided and fed in two signal phases 12a and 12b to one voltage-frequency converter 13a and 13b, respectively, wherein, in the second signal phase 12b, a signal reversing device 14 is arranged which converts the analogous control signal in the signal phase 12b into a signal with a reversed value, i.e., a positive voltage signal is converted into a negative voltage signal and vice-versa. The positive analogous signals are converted, in the voltage-frequency converters 13a, 13b, into pulse signals with a frequency F which is dependent upon a voltage U of the analogous signal. These pulse signals are fed to one of pulse shapers 15a and 15b, respectively, which may comprise a monostable multivibrator, which holds the length of the pulse always constant independent of the frequency. The voltage-to-frequency converters 13a, 13b transmit only positive signals. Thus, when a negative signal is generated in the regulator 11, a pulse signal will be fed only to pulse shaper 15b since a positive signal will be developed in phase 12b due to the reversing device 14. However, no signal will be fed to the pulse shaper 15a since the negative signal from the regulator 11 is not reversed in phase 12a. When regulator 11 emits a positive signal, the opposite occurs; that is, a signal is fed to pulse shaper 15a, but not to pulse shaper 15b since, in phase 12b, the positive signal is reversed by the device 14.

Figure 2:
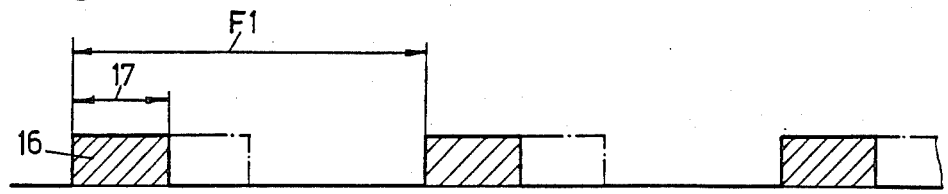
FIGS. 2 and 3 are diagrams showing pulse signals with different frequencies.
Figure 3:
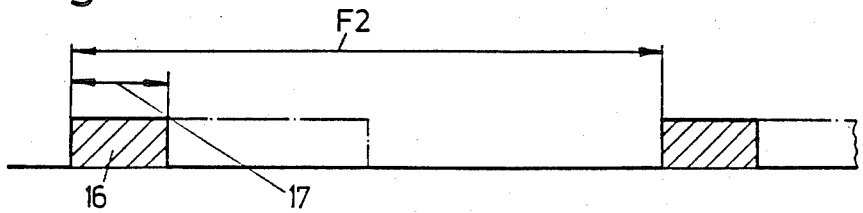

In FIGS. 2 and 3, there are shown a sequence of pulses 16 with a pulse length indicated at 17 at two different frequencies F1 and F2, wherein the dash-dot line shows the pulse length 17a when it is not kept constant.

It is also shown in FIG. 1 that the pulse signals are amplified by means of an amplifier 18a and 18b and are then fed directly to one of two magnets 19a and 19b of solenoid stop valves 20a and 20b. The two solenoid stop valves 20a and 20b form a servo control system 21 and are arranged in lines for a compressed medium, for example, air or oil, in order to form the servo control loop for the regulating unit 2. The control element of the regulating unit 2 is constructed as a piston-cylinder unit 22 which may be actuated by this compressed medium and which has a spring 23 arranged on the piston side. The one solenoid stop valve 20b is arranged in an inlet line 25 which leads from a compressed medium generator 24, for example, a compressed air network, to the piston-cylinder unit 22. The other solenoid stop valve 20a is arranged in an outline line 26 which leads from the piston-cylinder unit 22 to an outlet. In both the lines 25 and 26, adjustable throttles 27 are arranged.

In the operation of the sytem, if, for example, the flow rate which is measured in the measuring device 3 is too high as compared with the desired value, a positive control signal is emitted from regulator 11 which generates in the signal phase 12a pulses of a specific length with a frequency proportional to the differential value between the actual value and the desired value. The frequency, i.e., the pulses per unit of time, increase with increasing difference between the actual value and the desired value. Since the signal from regulator 11 is a positive signal which is reversed in device 14, no signal passes through converter 13b. However, pulses will be emitted from converter 13a. These pulse signals are conducted through the pulse shaper 15a and amplifier 18a to the magnet 19a whereby stop valve 20a opens in accordance with the pulse and the regulating unit 2 closes pulse-like due to the pressure of the spring 23 until the set rate of flow is achieved in line 1.

If the measured rate of flow is too low, a corresponding negative pulse signal is developed in regulator 11 which is then reversed in device 14, passed through converter 13 and then fed to the magnet 19b through pulse shaper 15b and amplifier 18b whereby, by opening the stop valve 20b, the compressed medium is conducted in pulses into the piston-cylinder unit 22 and the regulating unit 2 is opened further.

Figure 4:
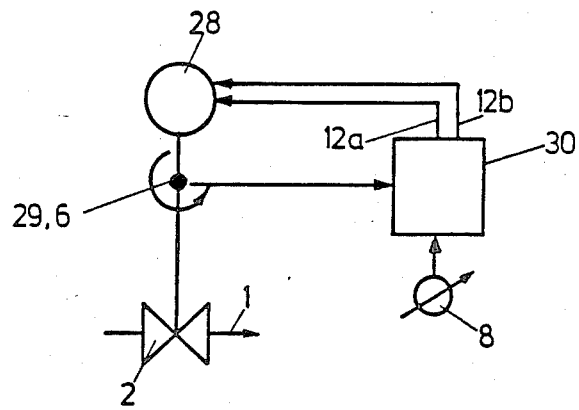
FIG. 4 is a schematic diagram showing a variation for the control of the position of an electric regulating unit in simplified illustration.

In accordance with a simplified variation of the present invention, there is shown an embodiment in FIG. 4 wherein the control element at the regulating unit 2 is comprised of an electric motor 28 and wherein the actual value transmitter 6 comprises a position alarm 29, for example, a synchro system directly connected with the control element. The desired value transmitter 8 in the embodiment of FIG. 4 is, for example, a potentiometer. The element identified with reference numeral 30 represents the portion of the system shown in FIG. 1 within the dash-dot line 30 and it consists of the regulating device whose outgoing signal phases 12a and 12b are connected directly with the electric motor 28. Adjustment of the regulating unit 2 occurs by means of the pulse-like drive of the electric motor with a frequency which is dependent upon the differential signal. In FIG. 4, the direction of rotation of the motor 28 is determined depending upon whether the singals come from the signal line 12a or from the signal line 12b.

Many advantages are attained in accordance with the method of the present invention and with the devices required therefor. Among the advantages which may be obtained are:

(1) that constant control behavior is maintained;

(2) that no disadvantageous influences occur on the controlling torque of the control elements;

(3) that the system can be used universally;

(4) that direct control of the electric drives and pulse operation are provided; and (5) that there is provided direct control of solenoid valves which control a compressed medium flow from or to the hydraulic or pneumatic control drive of the regulating unit and determine the pressure in the regulating space.

Due to the constant pulse length also at different frequencies, the step size of the control elements is always the same in the entire operating range which ensures an always constant behavior of the control drives or regulating units in the operating range.

Thus, in accordance with the present invention, it will be seen that there is provided a control loop having an actual value transmitter 6 and a desired value transmitter 7, the analogous control signal coming from a regulator 11 and being divided into two signal pulses 12a and 12b, wherein, in one signal phase 12b, the conversion is from positive to negative or vice versa by means of a signal reversing device 14. In both signal phases, always one voltage-to-frequency converter 13a, 13b, a pulse shaper 15a, 15b and an amplifier 18a, 18b are arranged. They produce pulse signals with a frequency which is dependent upon the voltage of the control signals. These pulse signals control solenoid stop valves 20a, 20b in a servo control system 21 for the control element 22 of the regulating unit 2 which can be acted upon with a compressed medium.

While specific embodiments of the invention have been shown and described in detail to illustrate the application of the inventive principles, it will be understood that the invention may be embodied otherwise without departing from such principles.

What is claimed is:

1. A method for regulating the flow and/or the pressure of a fluid medium comprising the steps of measuring the actual value of the flow volume or the pressure of said fluid medium, generating an analogous signal representative of said actual value and a signal representative of a desired value, comparing said actual value signal and said desired value signal and generating from said comparison an analogous differential signal, generating electrical control signals comprising two parallel analogous signals derived from said analogous differential signal, reversing one of said signals, applying said control signals as individual pulse signals having a frequency proportional to the value of said analogous differential signal, amplifying said control signals and applying said amplified control signals to control one of the pressure and rate of flow of said fluid medium.

2. A method according to claim 1, wherein the pulse length of the control signal is maintained constant independent of changes in the frequency thereof.

3. A method according to claim 1, wherein only signals with a positive amplitude are converted into said pulse signals.

4. A method according to claim 3, wherein said amplified control signals are applied to a regulating unit and wherein both pulse signals are conducted amplified to always one solenoid valve by means of which pressure pulses of a compressed medium are controlled at said regulating unit.

5. A method according to claim 3, wherein said amplified control signal is applied to a regulating unit and wherein both pulse control signals are conducted amplified to an electric motor of said regulating unit.

6. Apparatus for regulating the flow and/or the pressure of a fluid medium comprising actual value transmitter means for generating a signal representative of the actual value of the flow volume or the pressure to be controlled, a desired value transmitter for generating a signal representative of a desired value of the flow volume or the pressure of said flow medium, a comparator for comparing said actual value signal and said desired value signal and for generating an analogous differential signal therefrom, a regulator for receiving said analogous differential value signal and for generating a control signal, means for reversing said control signal, amplifier means for receiving and amplifying only control signals of one given polarity, and a regulating unit connected with said amplifier receiving said amplified control signal to control the flow or the pressure of said fluid medium, with at least one signal line with a voltage-to-frequency converter and a pulse shaper being arranged between said regulator and said amplifier means.

7. Apparatus according to claim 6, wherein said amplifier means comprise two amplifiers and wherein said reversing means is provided between said regulator and one of said amplifiers with a voltage-to-frequency converter and a pulse shaper being arranged between each of said amplifier and said regulator.

8. Apparatus according to claim 7, further comprising a pair of stop valves each including a magnet arranged in lines for a compressed medium, said lines being connected with said regulating unit in order to activate said regulating unit with said compressed medium, each of said amplifiers being in effective connection with always one of said magnets of said stop valves.

9. Apparatus according to claim 8, wherein one of said stop valves is arranged in an inlet line and the other of said stop valves is arranged in an outlet line for said compressed medium.

10. Apparatus according to claim 7, wherein said regulating unit comprises an electric motor and wherein each of said amplifiers is in effective connection directly with said regulating motor of said regulating unit.

* * * * *